United States Patent [19]

Toyomasu et al.

[11] Patent Number: 4,774,441
[45] Date of Patent: Sep. 27, 1988

[54] MOTOR CONTROL SYSTEM

[75] Inventors: Shunichi Toyomasu, Zama; Kazuo Sato, Tokyo, both of Japan

[73] Assignees: Nissan Motor Co., Ltd.; Niles Parts Co., Ltd., both of Japan

[21] Appl. No.: 911,745

[22] Filed: Sep. 26, 1986

[30] Foreign Application Priority Data

Sep. 30, 1985 [JP] Japan ................................ 60-214865

[51] Int. Cl.$^4$ .............................................. H02P 1/58
[52] U.S. Cl. ....................................... 318/102; 318/54
[58] Field of Search ..................... 318/51, 53, 54, 65, 318/101, 102, 103, 49, 50, 111, 112, 430

[56] References Cited

U.S. PATENT DOCUMENTS

| | | | |
|---|---|---|---|
| 3,792,332 | 2/1974 | Fuller | 318/103 X |
| 4,447,768 | 5/1984 | Terui | 318/293 |
| 4,608,637 | 8/1986 | Okuyama et al. | 318/103 X |
| 4,638,222 | 1/1987 | Sawaki | 318/112 X |
| 4,670,693 | 6/1987 | Kazami et al. | 318/112 |

FOREIGN PATENT DOCUMENTS

| | | | |
|---|---|---|---|
| 2719200 | 11/1978 | Fed. Rep. of Germany | 318/345 R |
| 56-3581 | 1/1981 | Japan | 318/283 |
| 57-52388 | 3/1982 | Japan | 318/293 |

Primary Examiner—Bentsu Ro
Attorney, Agent, or Firm—Leydig, Voit & Mayer

[57] ABSTRACT

A motor control system for controlling operation of a plurality of motors. The motor control system is composed of a microcomputer for performing sequential control of the motors. A plurality of integrated circuits are provided to drive the motors, respectively, in response to signal output from the microcomputer. Each integrated circuit has two input terminals connected respectively to two output ports of the microcomputer and two output terminals connected respectively to one terminals of the motors. Additionally, a change-over circuit is provided to change over the rotational direction of the motors in response to signals from the microcomputer. The change-over circuit has two input terminals respectively connected to two output ports of the microcomputer and an output terminal connected to the other input terminals of the motors, thereby reducing the number of the integrated circuits necessary for this system while reducing the number of the microcomputer output ports as compared with in conventional motor control systems.

10 Claims, 6 Drawing Sheets

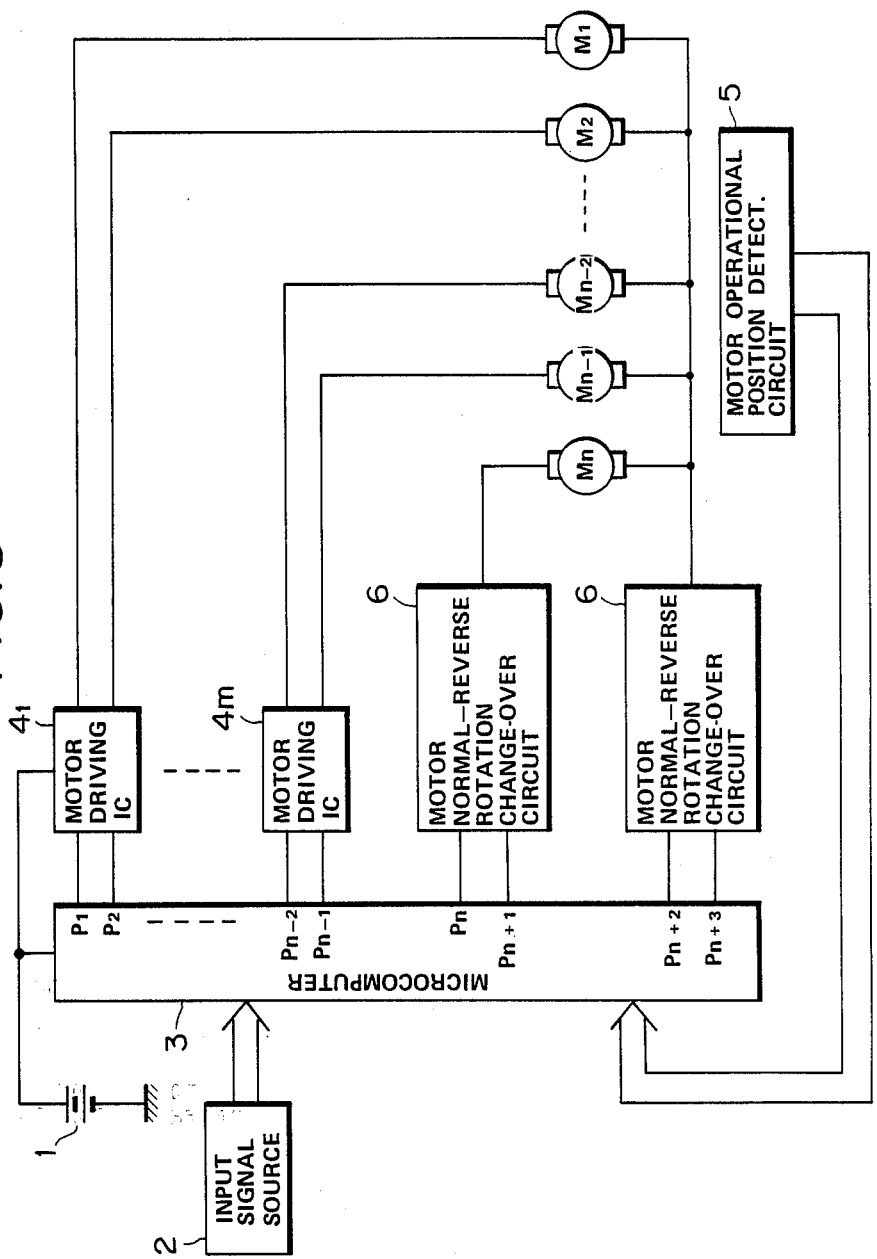

MOTOR CONTROL SYSTEM

BACKGROUND OF THE INVENTION

1. Field of the Invention

The present invention relates generally to a motor control system for controlling operation of a plurality of motors, and more particularly to such a motor control system arranged to reduce production cost and necessary space therefor as compared with conventional ones.

2. Description of the Prior Art

For example, an automatic air-conditioning system of automotive vehicles is provided with four motors for accomplishing control of opening degree of a door for mixing warm and cool air, change-over action of air blow-out openings, opening-and-closing action of a water valve and the like, in which sequential control of the four motors is made in response to signals from a sensor and the like by using a motor control system. Such a motor control system usually includes a microcomputer and a plurality of integrated circuits each connected to each motor. The integrated circuit is adapted to control the operation of each motor in response to signal output from the microcomputer.

However, such a motor control system necessitates one motor driving integrated circuit for each motor, and therefore the number of the integrated circuits increases as the number of the motors increases. Additionally, the microcomputer is required to have its output ports of the number of two times of the number of the motors. This increases production cost of the motor control system while increasing space occupied by the motor control system.

SUMMARY OF THE INVENTION

A motor control system of the present invention comprises a control circuit for performing the sequential control of a plurality of motors in response to signal input thereto. A motor driving device has input terminals connected to the output ports of the control circuit and output terminals connected to first input terminals of the motors, thereby driving motors in response to the signals output from the control circuit. A change-over device has the input terminals connected to the output ports of the control circuit and an output terminal connected to the second terminals of the motors, thereby changing over the rotational direction of the motors in response to signal output from the control circuit. Accordingly, in case of using a plurality of integrated circuits as the motor driving device, the necessary number of the integrated circuit reduces while reducing the number of the output ports of the control circuit such as a microcomputer as compared with conventional motor control systems, thus giving significant advantages from the view points of production cost and necessary space for the motor control system.

BRIEF DESCRIPTION OF THE DRAWINGS

FIG. 6 is a block diagram of a further embodiment of the motor control system in accordance with the present invention.

DETAILED DESCRIPTION OF THE INVENTION

Figure 1:
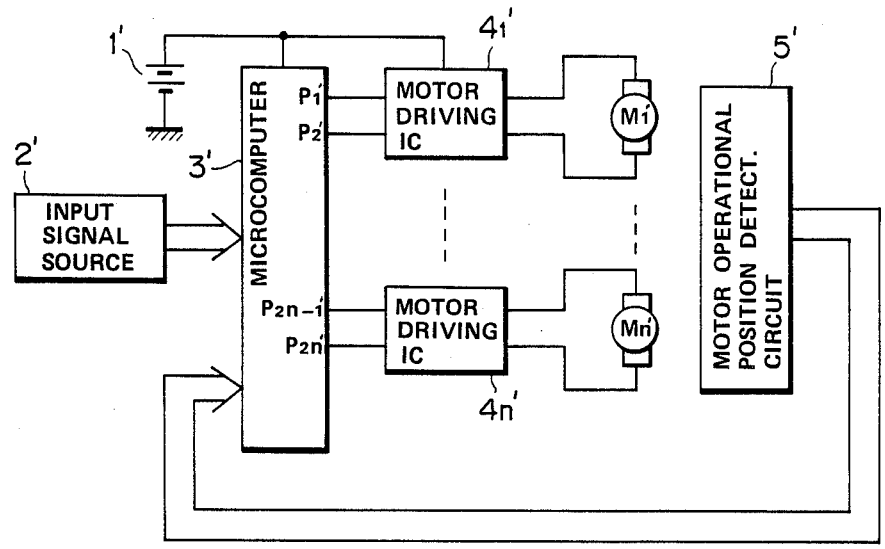
FIG. 1 is a block diagram of a conventional motor control system.

To facilitate understanding the present invention, a brief reference will be made to a conventional motor control system for controlling the operation of a plurality of motors $M_1'$ to $M_n'$, depicted in FIG. 1. Referring to FIG. 1, the conventional motor control system includes a microcomputer 3 to which an electric power source 1' is connected. Additionally, an input signal source 2' such as a sensor or a switch is connected to the microcomputer 3'. The microcomputer 3' has its output ports connected to integrated circuits $4_1'$ to $4_n'$ for driving the motors $M_1'$ to $M_n'$. The integrated circuits $4_1'$ to $4_n'$ are respectively provided for the motors so that the number of the integrated circuits corresponds to that of the motors $M_1'$ to $M_n'$. Accordingly, 2n output ports $P_1'$ to $P_{2n}'$ of the microcomputer 3' are connected to the integrated circuits $4_1'$ to $4_n'$. Two kinds of output signals from each integrated circuit are determined in accordance with high and low levels of two kinds of input signals from the microcomputer 3'. The output signals of the integrated circuit controls the operation of the motor corresponding to the integrated circuit in such a manner that the motor is stopped in case where the two kinds of output signals are the same in level whereas the motor is normally or reversely rotated in case where the two kinds of output signals are different in level. Additionally, a motor operational position detecting circuit 5' such as a rotation sensor is provided to detect the operational status of the respective motors $M_1'$ to $M_n'$. The output signals of the circuit 5' are input to the microcomputer 3.

However, in such a motor control system, one motor driving integrated circuit and two output ports of the microcomputer are necessary for each motor. Accordingly, as the number of the motors increases, the number of the motor driving integrated circuits increases while using a microcomputer having output ports of the number of at least two times the number of the motors, thus increasing the production cost of the motor control system and the space occupied by the same system.

Figure 2:
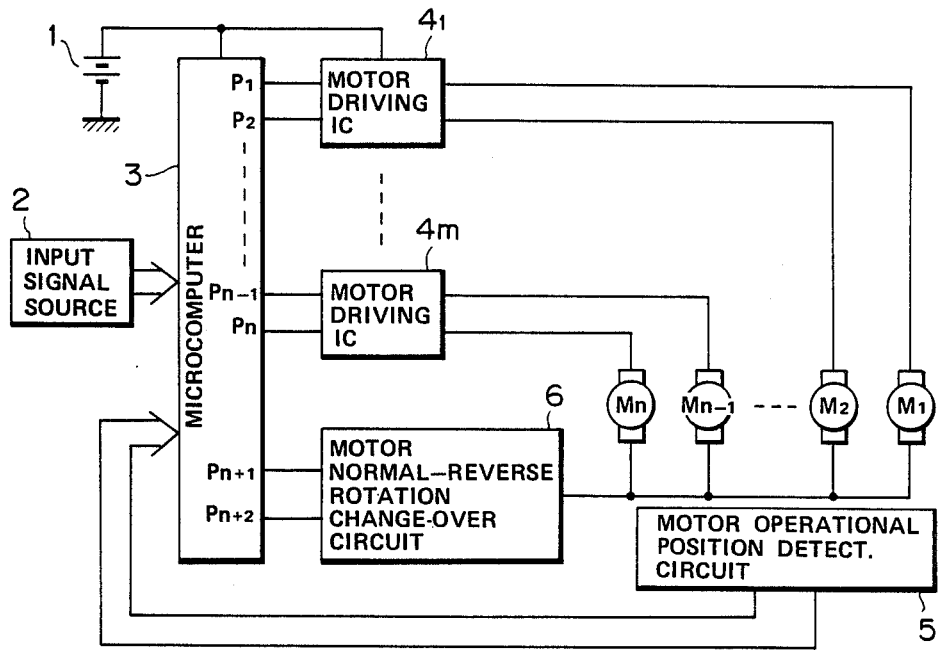
FIG. 2 is a block diagram of an embodiment of a motor control system in accordance with the present invention.

In view of the above description of the conventional motor control system, reference is now made to FIGS. 2 to 6, and more specifically to FIG. 2 wherein an embodiment of a motor control system according to the present invention is illustrated. The motor control system is for controlling the operation of a plurality of motors $M_1$ to $M_n$ which respectively drive, for example, a variety of devices such as a door for mixing warm and cool air, air blow-out opening change-over device, and a water valve in an air conditioning system of an automotive vehicle.

The motor control system comprises a microcomputer 3 to which an electric power source 1 is connected. Additionally, an input signal source 2 such as a switch or a sensor is connected to the microcomputer 3. The microcomputer 3 is so arranged as to output signals for accomplishing sequential control of the motors $M_1$ to $M_n$ in response to signals input from the input signal source 2 and from a motor operational position detecting circuit 5. The motor operational position detecting circuit 5 is arranged to detect the operational status (for example, of position stopping, normal rotation, and reverse rotation) of the motors $M_1$ to $M_n$ and output signals representative of the operational status to the microcomputer 3.

Figure 3:
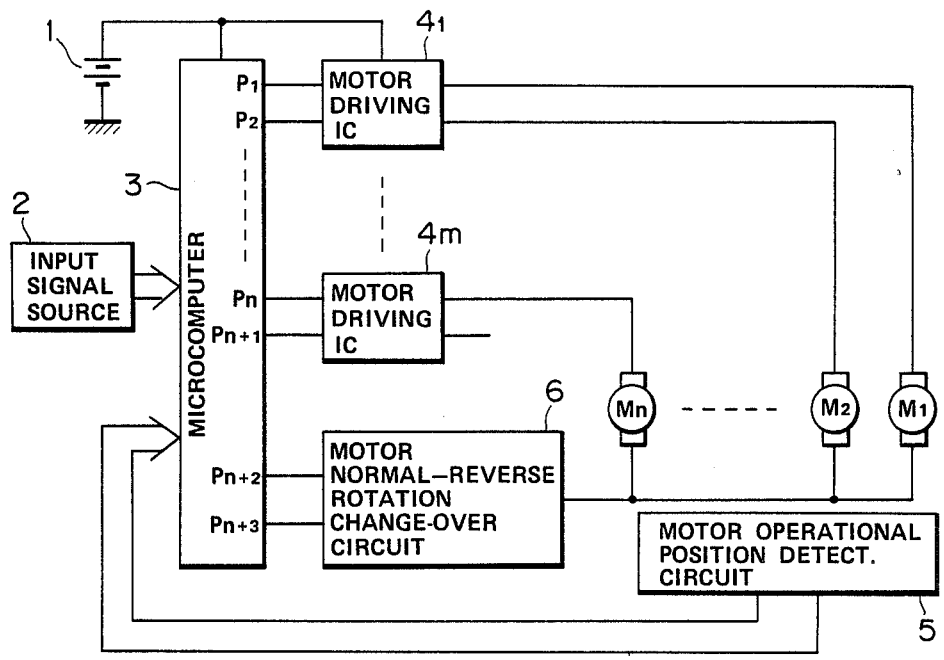
FIG. 3 is a block diagram of another embodiment of the motor control system in accordance with the present invention.

A plurality of integrated circuits $4_1$ to $4_m$ are provided to drive the motors $M_1$ to $M_n$ in resonse to the signals from the microcomputer 3. Each integrated circuit has two input terminals which are respectively connected to two output ports of the microcomputer 3. For example, the two input terminals of the integrated circuit $4_1$ are respectively connected to the output ports $P_1$, $P_2$ of the microcomputer 3. Similarly, the two input terminals of the integrated circuit $4_m$ are respectively connected to the two output ports $P_{n-1}$, $P_n$ of the microcomputer 3. Additionally, each integrated circuit has two output terminals which are respectively connected to one of the input terminals of one motor and one of the input terminals of another motor. For example, the two output terminals of the integrated circuit $4_1$ are respectively connected to one of the input terminals of the motor $M_1$ and one of the input terminals of the motor $M_2$. Similarly, the two output terminals of the integrated circuit $4_m$ are respectively connected to one of the input terminals of the motor $M_{n-1}$ and one of the input terminals of the motor $M_n$. Another input terminal of each motor is connected to a motor normal-reverse rotation change-over circuit 6 for changing over the normal rotation of the motor to the reverse rotation and vice versa in response to signals from the microcomputer 3. Accordingly, in case where the number n of the motors is an even number, the number m of the integrated circuits for motor driving is $\frac{1}{2}$ n, so that the number of the integrated circuits are sufficient to be half relative to that in the conventional motor control system as shown in FIG. 1. In case where the number n of the motors is an odd number as shown in FIG. 3, the number m of the integrated circuits for motor driving is $\frac{1}{2}$ (n+1). In addition, in case where the number n of the motors is an even number as shown in FIG. 2, the number of the output ports of the microcomputer 3 is n which is the same as the number of the motors. In case where the number n of the motors is an odd number as shown in FIG. 3, the number of the output ports of the microcomputer 3 is n+1.

Figure 4:
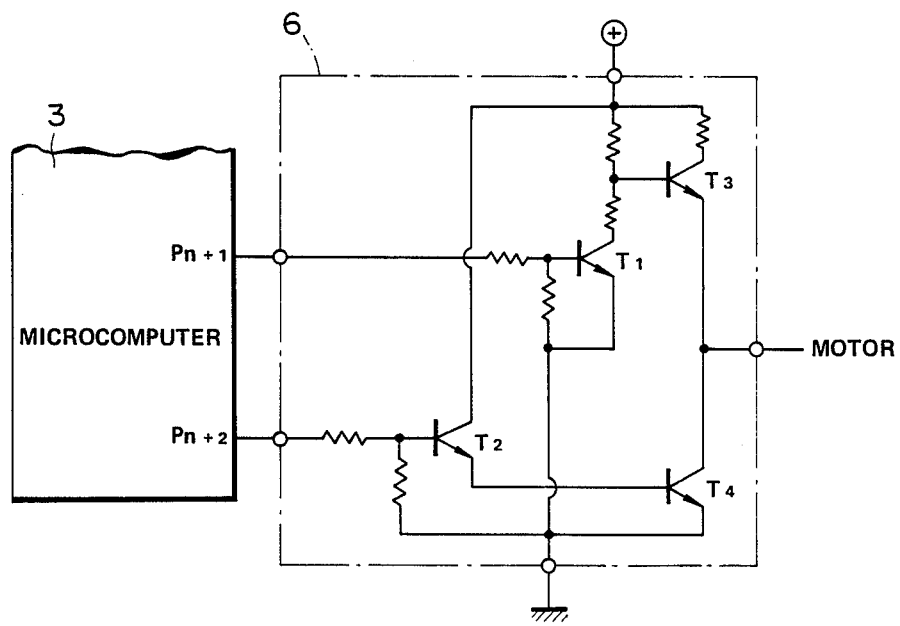
FIG. 4 is a circuit diagram of a motor rotational direction change-over circuit used in the motor control system of FIG. 2.

As shown in FIG. 4, the motor normal-reverse rotation change-over circuit 6 in FIG. 2 has two input terminals and an output terminal. The two input terminals are respectively connected to two output ports $P_{n+1}$, $P_{n+2}$, while the output terminal is connected to the input terminal of each motor as mentioned above. The circuit 6 includes two input side transistors $T_1$, $T_2$ which are respectively connected through its input terminals to the output ports $P_{n+1}$, $P_{n+2}$ of the microcomputer 3. In case of the embodiment of FIG. 3, the two input side transistors $T_1$, $T_2$ may be respectively connected to the outputs ports $P_{n+2}$, $P_{n+3}$. Additionally, the circuit 6 includes two output side transistors $T_3$, $T_4$ which are adapted be switched "ON" or "OFF" in response to "ON" or "OFF" of the input side transistors $T_1$, $T_2$. Thus, the circuit 6 outputs high or low level signal from the output terminal drawn from the two output side transistors $T_3$, $T_4$ in response to the levels of the signals applied from the two output ports of the microcomputer 3.

Here, the corresponding relationship between signal levels of the output ports $P_1$ to $P_{n+2}$ of the microcomputer 3 and rotational modes of the motors $M_1$ to $M_n$ is, for example, predetermined as shown in the following table:

TABLE

| Output port | $M_1$ Normal rotation | $M_1$ Reverse rotation | $M_2$ Normal rotation | $M_2$ Reverse rotation | ... | $M_{n-1}$ Normal rotation | $M_{n-1}$ Reverse rotation | $M_n$ Normal rotation | $M_n$ Reverse rotation |
|---|---|---|---|---|---|---|---|---|---|
| $P_1$ | H | L | L | H | L | L | L | L | L |
| $P_2$ | L | H | H | L | L | L | L | L | L |
| . | L | L | L | L | ... | L | L | L | L |
| $P_{n-1}$ | L | L | L | L | L | H | L | L | H |
| $P_n$ | L | L | L | L | L | L | H | H | L |
| $P_{n+1}$ | L | H | L | H | ... | L | H | L | H |
| $P_{n+2}$ | H | L | H | L | ... | H | L | H | L |

In accordance with the above table, each motor $M_1$, ..., or $M_n$ is arranged to make its normal rotation when the output signal from the motor normal-reverse rotation change-over circuit 6 is in "L(Low)" level upon output signal of the output port $P_{n+1}$ being in "L" level while the output signal of the output port $P_{n+2}$ being in "H(High)" level. On the contrary, each motor makes its reverse rotation when the output signal from the circuit 6 is in "H" level upon the output signal of the output port $P_{n+1}$ being in "H" level while the output signal of the output $P_{n+2}$ being in "H" level.

The manner of operation of the thus configurated motor control system will be discussed.

Figure 5A:
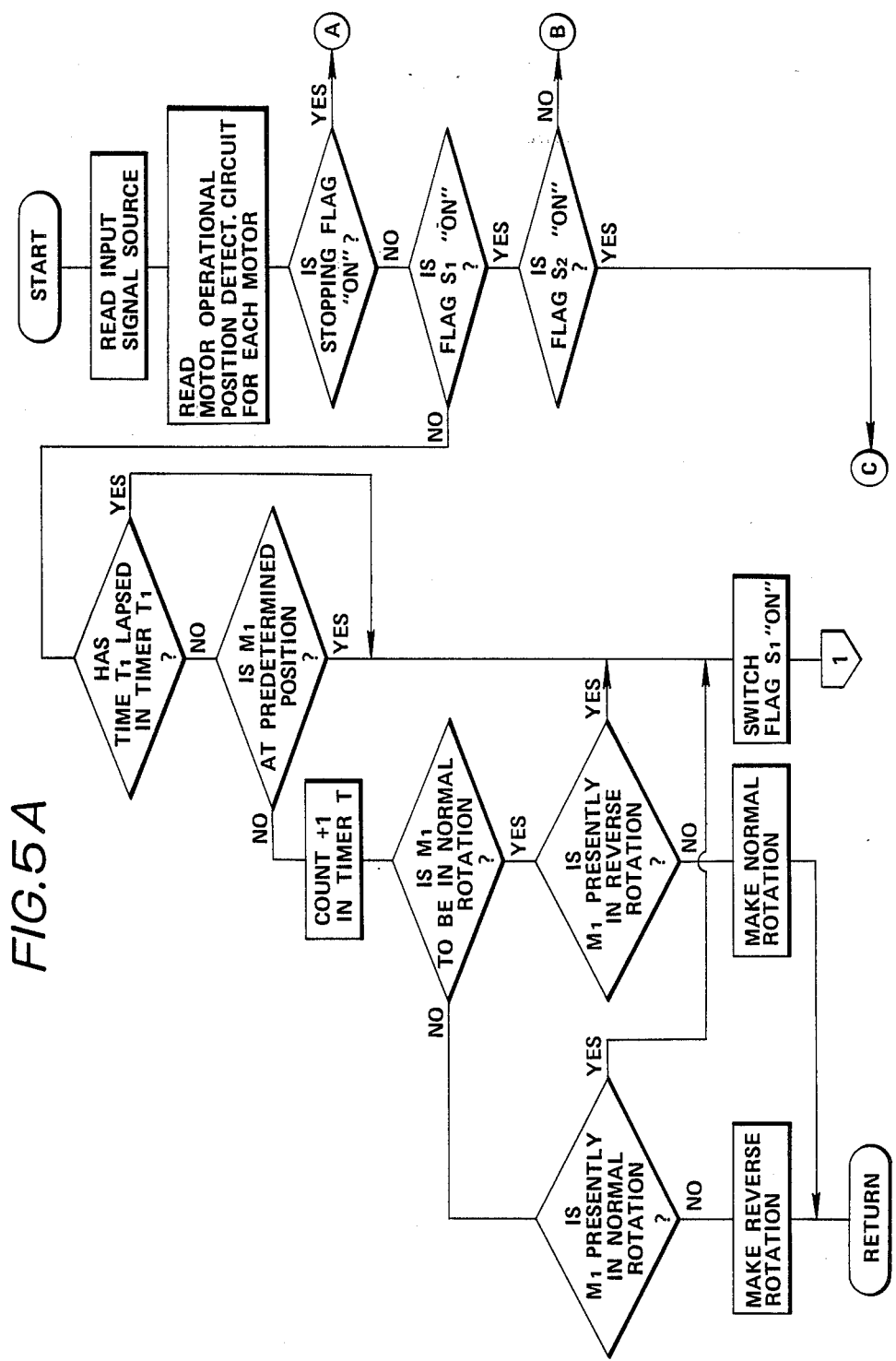
FIGS. 5A to 5C are flow charts of an example of motor control according to the motor control system of the present invention.
Figure 5B:
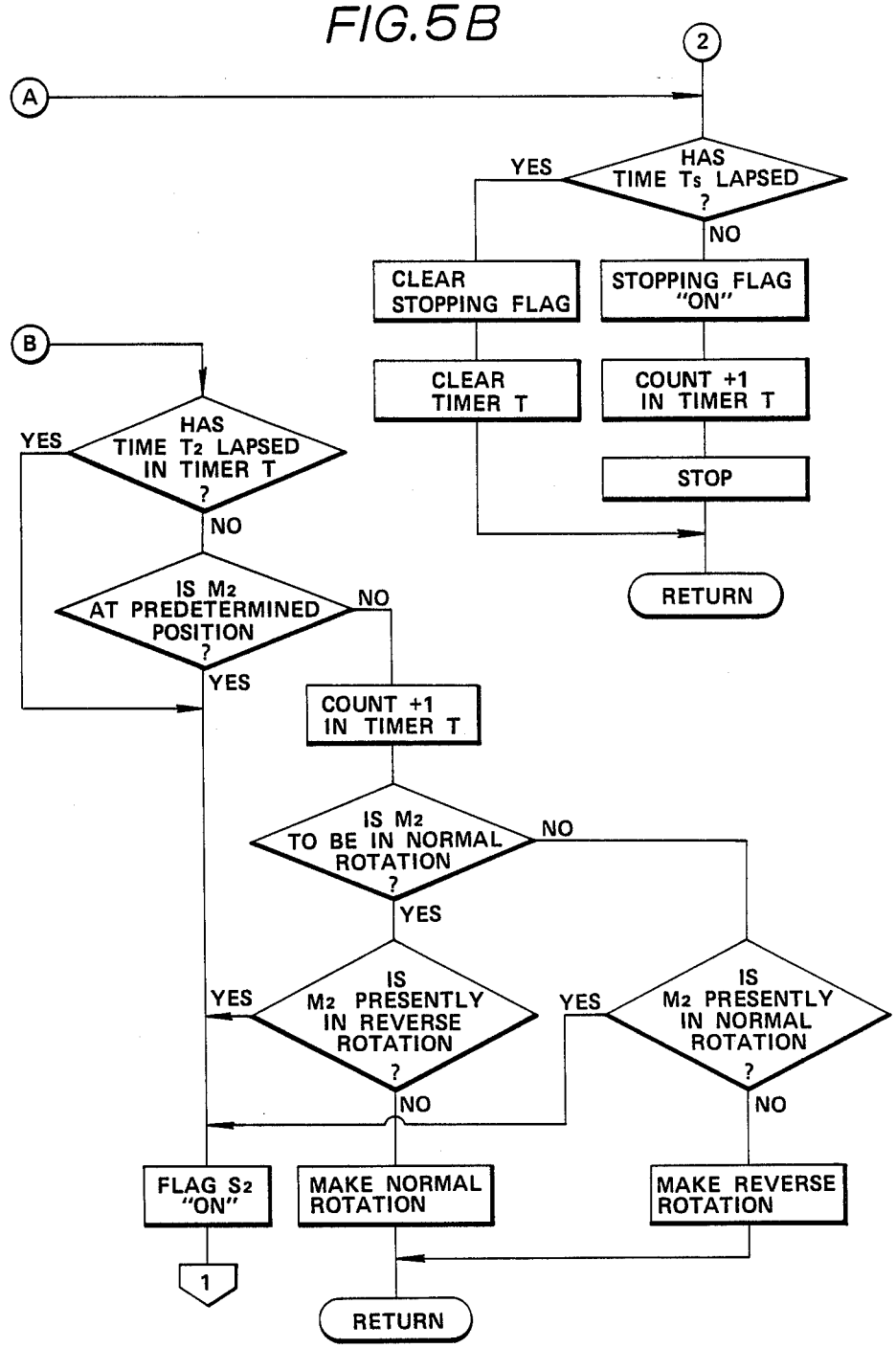
Figure 5C:
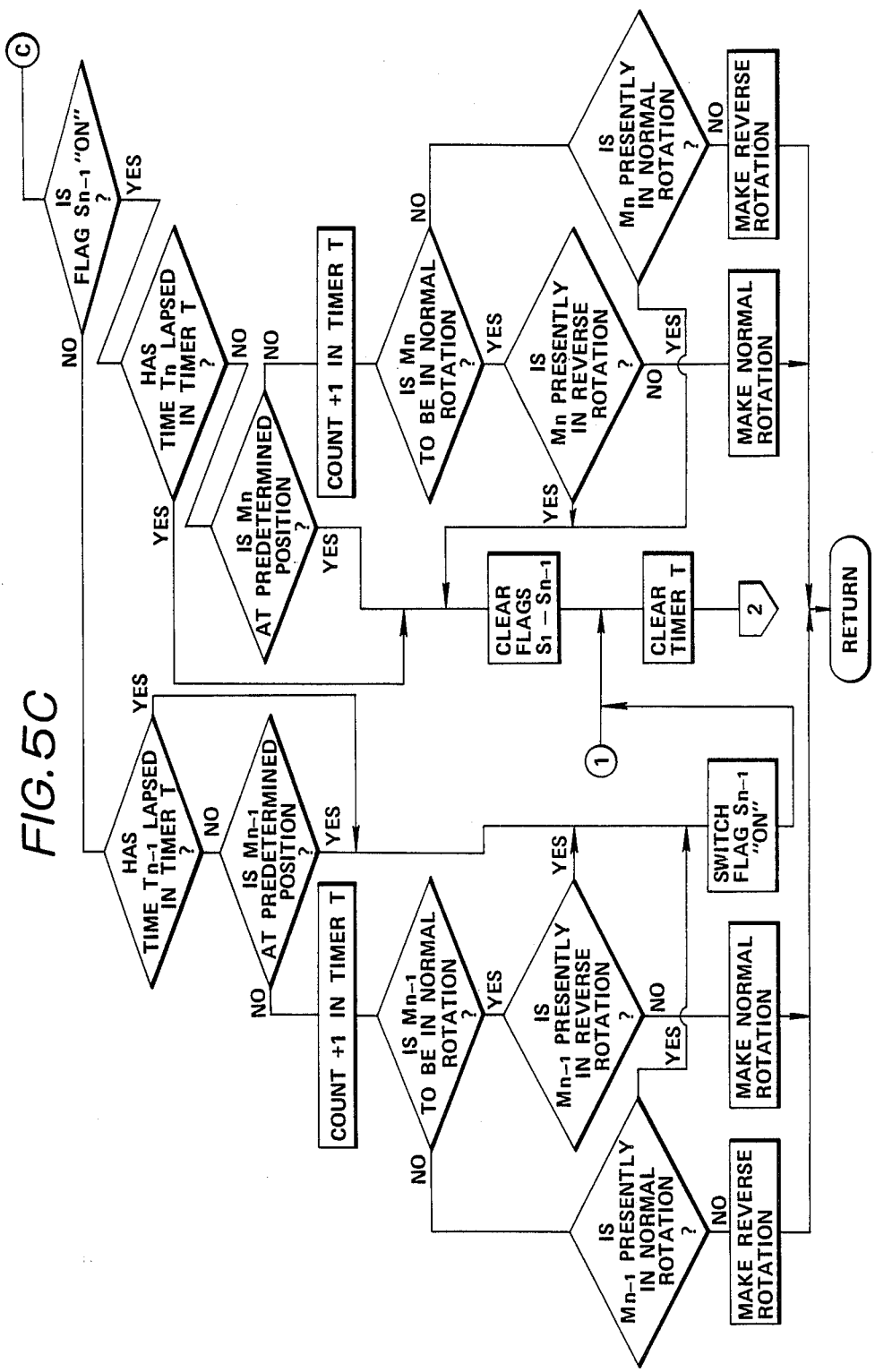

First the microcomputer 3 decides as to whether each motor makes its stopping, normal rotation or reverse rotation upon receiving the signals from the input signal source 2 and the signals from the motor operational position detecting circuit 5. In accordance with this decision, the microcomputer 3 outputs control signals to the respective integrated circuits $4_1$ to $4_m$ and to the motor normal-reverse rotation change-over circuit 6, thus sequentially controlling the operation of the respective motors $M_1$ to $M_n$. In this case, the control time $T_1, \ldots, T_n$ (as shown in FIGS. 5A to 5C) of each motor is decided in accordance with use or response time of the motor, and the respective motors $M_1$ to $M_n$ are successively placed in the desired operational status determined by the microcomputer 3. Additionally, in such motor control, a predetermined stopping time $T_s$ (as shown in FIGS. 5A to 5C) is set before the motor is changed into its normal rotation or into its reverse rotation, or before control is shifted from one motor to another motor, thereby preventing power source short circuit of the output section of the motor normal-reverse rotation change-over circuit 6 and simultaneous rotation of two or more motors caused by retarded response of hardware relative to the control signals from the microcomputer 3.

FIGS. 5A to 5C show a flow chart of an example of the motor control or operation of the motor control system shown in FIGS. 2 and 4. In the flow chart of FIGS. 5A to 5C, a step of "Count +1 in Timer T" instructs to count up "+1" in Timer T and accordingly is also represented as "T=T+1". Therefore, upon execution of the program, a variable T is counted up as T=1, 2, 3 . . . This counting-up step is for measuring rotation time of the motor. More specifically, when the motor makes its normal rotation or reverse rotation, the counting-up step is passed upon every lapse of a predetermined time, so that the rotation time of the motor is decided by the variable T.

With respect to a step of "Is Stopping Flag "ON" ?", the stopping flag "ON" means that all the motors are stopped.

With respect to "Flags $S_1$ to $S_{n-1}$", for example, "$S_1$ Flag" is adapted to be switched ON when the motor $M_1$ reaches a predetermined position or when the measured time $T_1$ lapses. When the motor $M_1$ reaches the predetermined position, a device driven by the motor $M_1$ reaches its desired state. In case where the device is the door for mixing warm and cool air, when the motor $M_1$ reaches the predetermined position, the opening degree of the mixing door reaches a predetermined value. This operational position of the door is detected by the above-mentioned motor operational position detecting circuit 5. An example of the circuit 5 is a potentiometer disposed at an opening and closing part of the mixing door though not shown.

Accordingly, when the decision of the step of "Is Flag $S_1$ "ON" ? "is "Yes", the device driven by the motor $M_1$ has reached a predetermined state or the motor $M_1$ has operated a time more than the time $T_1$ and then the motor $M_1$ is stopped. If the decision is "No", the operation of the motor $M_1$ is continued.

Similarly, Flag $S_2$ is in connection with the motor $M_2$ and time $T_2$ in the timer T. Thus, under the action of Flags $S_1$ to $S_{n-1}$, the motors $M_1$ to $M_n$ can be successively operated within a predetermined time. Addtionally, in the flowchart of FIGS. 5A to 5C, ① is connected to ①, and ② is connected to ②.

Returning to FIG. 3, a second embodiment of the motor control system according to the present invention is illustrated in which the number of the motors $M_1$ to $M_n$ is an odd number. As shown, nothing is connected to one of the two output terminals of $\frac{1}{2}$ (n+1) th integrated circuit $4_m$. It will be understood that the integrated circuit $4_m$ may be replaced with another motor normal-reverse rotation change-over circuit 6 as illustrated in FIG. 6, in which (n−1) motors $M_1$ to $M_{n-1}$ are connected to the output terminals of $m=\frac{1}{2}$ (n−1) integrated circuits $4_1$ to $4_m$, whereas remaining one motor $M_n$ is connected to the output terminal of the additional (another) motor normal-reverse rotation change-over circuit 6. In the embodiments of FIGS. 3 and 6, the same reference numerals as in FIG. 2 designate the same elements and parts.

The above-discussed three embodiments of the present invention give the following advantages as compared with the conventional motor control system of FIG. 1:

First in case of the embodiment of FIG. 2, the number of output ports of the microcomputer 3 to be used is n+2 and therefore less than that in the conventional case of FIG. 1 by 2n−(n+2)=n−2. Furthermore, the number of the integrated circuits for motor driving in the case of FIG. 2 embodiment is less than that in the conventional case by n−$\frac{1}{2}$n=$\frac{1}{2}$n.

In case of the embodiment of FIG. 3, the number of the output ports of the microcomputer 3 to be used is n+3 and therefore less than that in the conventional case by 2n−(n+3)=n−3. Furthermore, the number of the integrated circuits for motor driving is less than that in the conventional case by n−$\frac{1}{2}$ (n+1)=$\frac{1}{2}$ (n−1).

Further in case of the embodiment of FIG. 6, the number of the output ports of the microcomputer 3 is n+3 and therefore less than that in the conventional case by 2n−(n+3)=n−3. Additionally, the number of the integrated circuits for motor driving is less than in the conventional case by n−$\frac{1}{2}$ (n+1)=$\frac{1}{2}$ (n−1).

It will be understood that such advantages become predominant as the number n of the motors increases.

As is appreciated from the above, according to the present invention, the number of the motor driving integrated circuits and the microcomputer output ports are sufficient to be much less than that in the conventional cases, thereby achieving production cost reduction, necessary space reduction and effective use of the microcomputer output ports.

What is claimed is:

1. A motor control system for controlling operation of a plurality of motors each having first and second input terminals, said control system comprising:
    a control circuit for performing sequential control of the motors in response to signals input thereto, said control circuit having output ports;
    means for driving said motors in response to signals output from said control circuit, said driving means having input terminals connected to said control circuit output ports, and output terminals connected to said motor first input terminals;
    first change-over means for changing over rotational direction of said motors in response to signals output from said control circuit, said first changing-over means having input terminals connected to said control circuit output ports, and an output terminal connected to the second terminals of said motors; and
    means for detecting operational status of each motor and outputting signals representative of the operational status of each motor to said control circuit.

2. A motor control system as claimed in claim 1, wherein said first changing-over means is a motor rotational direction changing over circuit including first and second input terminals respectively connected to different output ports of said control circuit, an output terminal connected to the second terminals of the motors, a first transistor connected to said first input terminal, a second transistor connected to said second input terminals, a third transistor connected to said first and second transistors, and a fourth transistor connected to said second and third transistors, said output terminal being connected to said third and fourth transistors.

3. A motor control system as claimed in claim 1, further comprising means for producing signals for commanding operation of at least one of the motors and outputting said signals to said control circuit.

4. A motor control system as claimed in claim 3, wherein said signal producing means includes a sensor for sensing a condition to be regulated by at least one of the motors.

5. A motor control system as claimed in claim 3, wherein said signal producing means includes a switch to be switched so as to control operation of at least one of the motors.

6. A motor control system as claimed in claim 3, wherein said signals output from said control circuit are in accordance with said signals from said motor operational status detecting means and said signal producing means.

7. A motor control system as claimed in claim 1, wherein said motor driving means includes a plurality of integrated circuits each having two input terminals respectively connected to two different output ports of said control circuit, and first and second output terminals respectively connected to said first input terminals of different two motors.

8. A motor control system as claimed in claim 7, wherein the number of said integrated circuits is an odd number, wherein said motor control system further comprises second change-over means for changing over rotational direction of one of the motors in response to signals output from said control circuit, said second change-over means having input terminals connected to said control circuit output ports, and an output terminal connected to the first terminal of said one of the motors.

9. A motor control system as claimed in claim 7, wherein the number of said integrated circuits is an even number.

10. A motor control system as claimed in claim 7, further comprising an additional integrated circuit having an input port connected to an output port of said control circuit, and an output port connected to a motor.

* * * * *